United States Patent [19]

Steckler et al.

[11] 4,293,870

[45] Oct. 6, 1981

[54] CIRCUIT ARRANGEMENT FOR MULTIPLEXING AN INPUT FUNCTION AND AN OUTPUT FUNCTION AT A SINGLE TERMINAL

[75] Inventors: Steven A. Steckler, Clark; Alvin R. Balaban, Lebanon, both of N.J.

[73] Assignee: RCA Corporation, New York, N.Y.

[21] Appl. No.: 117,237

[22] Filed: Jan. 31, 1980

[51] Int. Cl.³ .............................................. H04N 9/62
[52] U.S. Cl. ...................................... 358/10; 358/139
[58] Field of Search .................... 358/10, 21, 160, 139

[56] References Cited

U.S. PATENT DOCUMENTS 3,959,811  5/1976  Shanley ................................ 358/10
4,173,769 11/1979  van Straaten ........................ 358/20

Primary Examiner—Richard Murray

Attorney, Agent, or Firm—Paul J. Rasmussen; William H. Meagher; W. Brinton Yorks, Jr.

[57] ABSTRACT

A circuit arrangement is provided for multiplexing an input signal and an output signal through a single circuit terminal. Means are coupled to the terminal for selectively applying first input signals to the terminal of a signal level included within a first range of signal levels. Means including a first transistor having an input electrode coupled to a second signal source and an output electrode coupled to the terminal are provided for developing, in the absence of the first input signals, output signals at the terminal which occupy a second range of signal levels which is exclusive of the first range. A second transistor has an input electrode coupled to the terminal and an output electrode, and is biased to be responsive to signals at the terminal which occupy the first range of signal levels.

10 Claims, 1 Drawing Figure

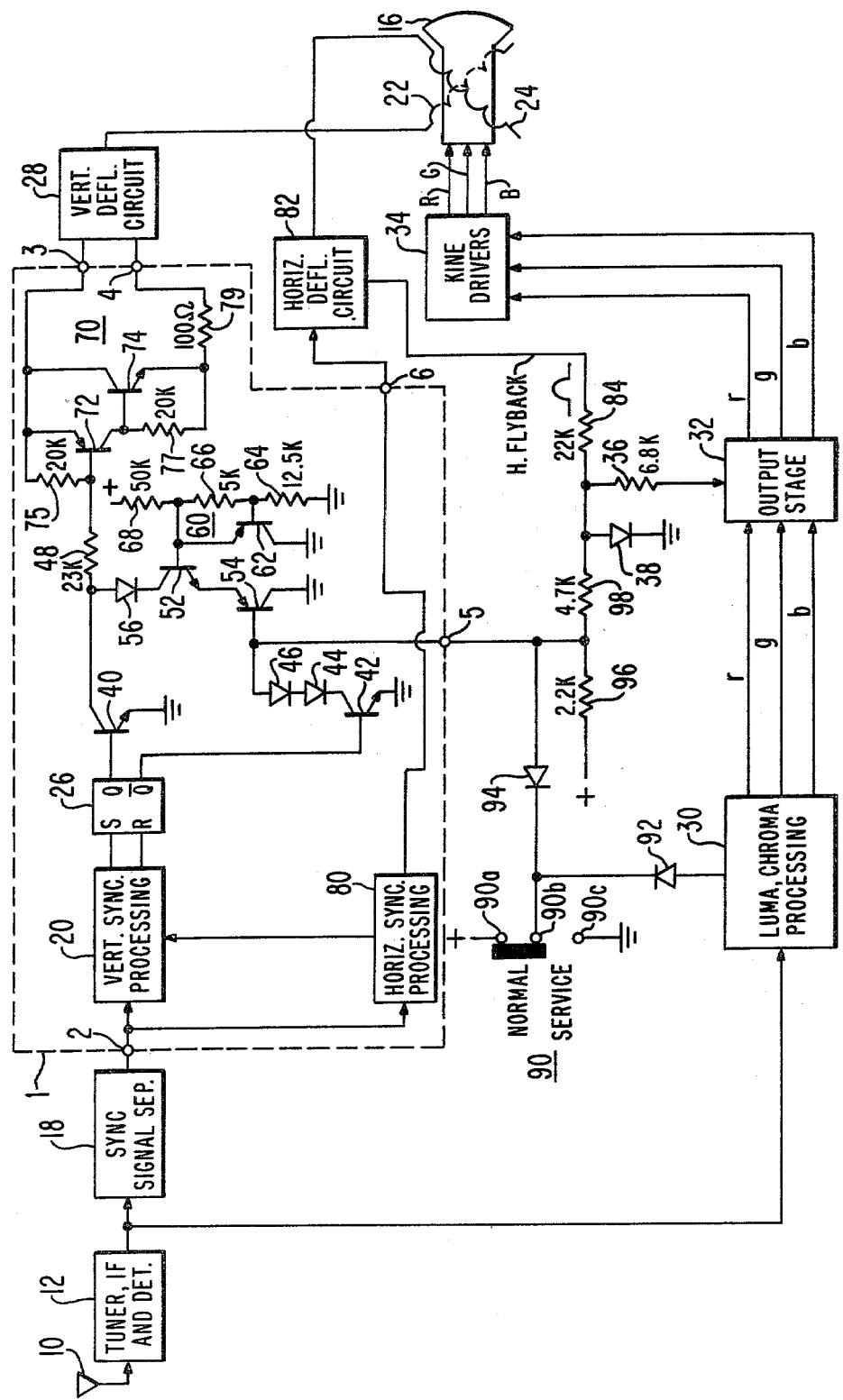

CIRCUIT ARRANGEMENT FOR MULTIPLEXING AN INPUT FUNCTION AND AN OUTPUT FUNCTION AT A SINGLE TERMINAL

This invention relates to circuit arrangements for multiplexing an input function and an output function at a single terminal and, more particularly, to a circuit arrangement for multiplexing a service mode signal and a vertical blanking signal at a single circuit point in a television receiver.

It is advantageous to provide two modes of operation in a television receiver: the normal mode, during which received signals are processed for viewing, and the service mode, during which the circuits of the receiver may be adjusted for optimum performance. Mode selection may be accomplished by switching a simple single pole, double throw switch. In the normal operating mode, signal processing circuits, such as the deflection circuitry and the luminance and chrominance processing circuitry, provide the customary deflection drive and processed video signals to the television kinescope. In the service mode, the vertical scanning signals are disabled, so that only a single line is repetitively scanned on the face of the kinescope, and the luminance and chrominance processing circuits are disabled so that the kine driver circuits may be adjusted for balanced operation.

In the normal mode of operation, the deflection and luminance and chrominance circuits interact with each other to present a properly synchronized video display. For example, when the deflection circuits are deflecting the beam from the bottom of the kinescope screen to the top during the vertical retrace interval, a vertical blanking signal is provided to the luminance and chrominance circuits to disable them during this time, so that the scanning beam does not illuminate the screen as it returns to the top of the raster. However, when the receiver is operated in the service mode, there is no vertical blanking interval, but it is still necessary to disable the luminance and chrominance circuits to prevent the application of video signal information to the kine driver while they are being adjusted for balanced operation.

When much of the deflection signal processing and luminance and chrominance signal processing circuitry is manufactured in integrated circuit form, as is presently the case, it is desirable to minimize the number of connections made to the integrated circuits. This is because connections to external circuits must be done through terminals on the integrated circuit package, which are in part a determinant of the size and cost of the integrated circuits. In order to minimize the required number of I.C. terminals, it is desirable to combine, or multiplex, several functions on a single terminal. It has been found that it is advantageous to multiplex the signal which indicates the service mode with other signals at an I.C. terminal, since the service function is normally used only rarely and can be combined with other functions which are disabled during the service mode of operation.

In accordance with the principles of the present invention, a circuit is provided which multiplexes an output signal from a television deflection circuit and a service mode input signal at a single circuit terminal. A first transistor is provided which has an input electrode coupled to receive a deflection signal from deflection signal processing circuitry and an output electrode coupled to the terminal. A second transistor is provided which has an input electrode coupled to the terminal. Means for providing a signal indicative of a service mode is also coupled to the terminal. When the service mode signal is not present at the terminal, the first transistor provides a deflection signal at the terminal. Operation of the first transistor does not cause the second transistor to become conductive. When the service mode signal is applied to the terminal, the signal at the output electrode of the first transistor is eliminated, and the second transistor becomes conductive so as to disable the drive circuits for the vertical deflection system. The deflection signals and the service mode signal which are alternatively present at the terminal may also be applied to the luminance and chrominance processing circuitry in the television receiver, to synchronize the operation of this circuitry to the deflection signals during normal operation, and to disable this circuitry during the service mode of operation. The deflection signal processing circuitry, the first and second transistors, and the vertical deflection drive circuits may be advantageously constructed in integrated circuit form, with only the single terminal described above required for the multiplexing of the deflection output signal and the service mode input signal for the I.C.

The single drawing illustrates, partially in block diagram form and partially in schematic diagram form, the video signal processing portion of a television receiver arranged in accordance with the principles of the present invention.

In the drawing, video signals are received by an antenna 10 and applied to tuner, intermediate frequency processing, and video detector circuitry 12. The detected video signal is applied to a synchronizing signal separator 18 and luminance and chrominance processing circuitry 30. The luminance and chrominance processing circuitry processes the video signal to produce red, green and blue color signals, which are buffered by an output stage 32 and applied to kinescope driver 34. The amplified red, green and blue color signals are then applied to electrodes on a kinescope 16 for display of the color picture information.

Horizontal and vertical sync signals are separated from the video signal by the separator 18 and are applied to horizontal sync processing circuitry 80 and vertical sync processing circuitry 20 at a terminal 2. The horizontal sync processing circuitry 80 develops horizontal deflection drive signals at its output, which are coupled to a horizontal deflection circuit 82 by way of a terminal 6. The horizontal deflection circuit 82 produces deflection waveforms, which are applied to a winding 24 on the kinescope 16. The horizontal deflection circuit also produces horizontal flyback signals, which are applied to the color signal output stage 32 by the serial connection of resistors 84 and 36.

The vertical sync processing circuitry 20 decodes horizontal rate signals from the horizontal sync processing circuitry 80 and vertical sync signals to produce properly timed vertical deflection drive signals at its complementary outputs. The vertical deflection drive signals are held by an R-S flip-flop 26 and reproduced in complementary form at its outputs. The Q output of the R-S flip-flop 26 is coupled to the base of an NPN transistor 40, which has an emitter coupled to a point of reference potential (ground) and a collector coupled to the base of a PNP transistor 72 by a resistor 48. A resistor 75 is coupled between the emitter and base electrodes of transistor 72, and the collector of the transistor 72 is coupled to the base of an NPN output transistor 74. A resistor 77 is coupled between the base and emitter electrodes of the transistor 74. The emitter of transistor 74 is coupled to one input of a vertical deflection circuit 28 by a resistor 79 and a terminal 4, and the collector of transistor 74 is coupled to the emitter of transistor 72 and to a second input of the vertical deflection circuit 28 by a terminal 3. The vertical deflection circuit 28 produces deflection waveforms, which are applied to a winding 22 on the kinescope 16.

The $\overline{Q}$ output of the R-S flip-flop 26 is coupled to the base of an NPN transistor 42, the emitter of which is coupled to ground. The collector of the transistor 42 is coupled to the cathode of a diode 44, the anode of which is coupled to the cathode of a diode 46. The anode of diode 46 is coupled to a terminal 5, and to the base of a PNP transistor 54. The collector of the transistor 54 is coupled to ground, and its emitter is coupled to the emitter of an NPN transistor 52. The collector of the transistor 52 is coupled to the cathode of a diode 56, the anode of which is coupled to the collector of transistor 40. The base of the transistor 52 is coupled to a multiple $V_{be}$ biasing circuit 60. The multiple $V_{be}$ biasing circuit 60 includes a PNP transistor 62, the emitter of which is coupled to the base of transistor 52 and to a source of supply voltage (+) by a resistor 68. The collector of transistor 62 is coupled to ground, and its base is coupled to ground by a resistor 64, and to the emitter of the transistor by a resistor 66.

A single pole, double throw service switch 90 includes a terminal 90a which is coupled to the + voltage supply, a terminal 90c which is coupled to ground, and a common terminal 90b which is coupled to the cathodes of two diodes 92 and 94. The anode of the diode 92 is coupled to the luminance and chrominance processing circuitry 30. The anode of the diode 94 is coupled to the terminal 5 and to the + voltage supply by a resistor 96. Terminal 5 is also coupled to the anode of a limiting diode 38 by a resistor 98. The cathode of the diode 38 is connected to ground. The anode of the diode 38 is also coupled to the junction of resistors 36 and 84.

The horizontal and vertical sync processing circuitry which is enclosed in the dashed box 1 may be advantageously constructed in integrated circuit form. When so constructed, the terminals 2-6 represent I.C. terminals necessary for input and output signal connections to and from the I.C. package. Only those terminals necessary to illustrate the operation of the embodiment of the present invention are shown in the drawing; other I.C. terminals, such as those necessary for connection to power supplies and additional filter elements, have been omitted to simplify the drawing.

In the normal operating mode, service switch terminal 90a is connected to the common terminal 90b, which back-biases diodes 92 and 94. The service switch 90 thus has no effect on the receiver during this normal mode of operation. In the normal mode, terminal 5 acts as an output terminal for the deflection circuitry, which provides vertical blanking signals to the luminance and chrominance output stage 32 at this time in accordance with the following description.

The vertical sync processing circuitry 20 produces vertical deflection drive signals at its outputs, which are stored by setting the R-S flip-flop 26. When the flip-flop is set, the Q output goes to a high state, causing transistors 40 and 72 to turn on, which in turn causes output transistor 74 to conduct heavily. Conduction by transistors 72 and 74 initiates the vertical retrace cycle in the vertical deflection circuit 28, as by discharging a capacitor in that circuit through transistors 72 and 74. At the end of the vertical retrace interval, transistors 40, 72 and 74 are turned off when the R-S flip-flop 26 is reset in response to the signals received from the vertical sync processing circuitry 20.

When the R-S flip-flop 26 is set during the vertical retrace interval, the $\overline{Q}$ output of the flip-flop goes to a low state, which turns off transistor 42. With transistor 42 turned off, a vertical blanking signal is developed at terminal 5, which is pulled up to approximately a fractional proportion of the + supply by current flowing through resistor 96. The vertical blanking signal is applied to the anode of diode 38 by resistor 98, which limits the signal. From this point, the vertical blanking signal is applied to the color signal output stage 32 by resistor 36. The vertical blanking signal effectively blocks the signals produced by the luminance and chrominance processing circuitry 30 and prevents them from reaching the kinescope drivers 34. This prevents any display of video on the kinescope screen as the scanning beams are returned to the top of the raster during the vertical retrace interval.

Between vertical retrace intervals, the R-S flip-flop output Q is in a high state, which turns on transistor 42. The voltage level at terminal 5 is then established by diodes 44 and 46, and is at a level of approximately two diode voltage drops above ground (2 $V_{be}$), plus the saturation voltage drop across the collector-to-emitter path of transistor 42, which is negligible. This 2 $V_{be}$ level is insufficient to turn on transistors 52 and 54, which are thus turned off continuously during the normal operating mode. This is because the emitter of transistor 54 is maintained at approximately 2.5 $V_{be}$ by the transistor 52 and the multiple $V_{be}$ biasing circuit 60.

Transistor 62 of the multiple $V_{be}$ biasing circuit will exhibit a 1 $V_{be}$ drop from its emitter to its base electrode. In the illustrated embodiment, resistors 64 and 66 function as a voltage divider, and are illustratively shown as having values of 12.5 Kohms and 5 Kohms, respectively. Since the value of resistor 64 is 2.5 that of resistor 66, and resistor 66 is dropping 1 $V_{be}$ of voltage, resistor 64 will drop 2.5 $V_{be}$ of voltage when the base current of transistor 62 is neglected. Thus, the voltage level at the base of transistor 52 is 3.5 $V_{be}$ (2.5 $V_{be}$+1 $V_{be}$), and the voltage at the emitter of transistor 52 is 2.5 $V_{be}$. It is seen that transistor 54 cannot become conductive until its base electrode is pulled down to a voltage level of 1.5 $V_{be}$ or lower. Conduction by transistor 42 will only pull the base voltage of transistor 54 down to a 2 $V_{be}$ level; therefore, transistor 54 will remain nonconductive during the entire normal operating mode.

In addition to receiving the vertical blanking signal, the output stage 32 also receives horizontal blanking signals in the form of horizontal flyback pulses. These pulses are supplied from the horizontal deflection circuit 82 by way of resistor 84, are limited by diode 38, and applied to the output stage 32 by way of resistor 36. The horizontal blanking signals block the color signals during the horizontal retrace intervals, again to prevent unwanted screen illumination. During the vertical blanking interval, the two blanking signals are combined at the junction of resistors 36, 84 and 98; however, either signal is sufficient to block the color signals from the luminance and chrominance processing circuitry 30.

When the service switch is switched to its service mode setting, terminal 90c is connected to the common terminal 90b, which grounds the cathodes of diodes 92 and 94. Diode 92 is now forward biased, which disables the luminance and chrominance processing circuitry 30. With this circuitry disabled, the kinescope drivers can be adjusted without interference from any received video signals. In addition, the grounding of the cathode of diode 94 forward biases that diode and applies a 1 $V_{be}$ level to terminal 5, which now becomes an input terminal.

During the service mode, transistors 40 and 42 will continue to be switched in response to the setting and resetting of the R-S flip-flop 26. However, transistor 42 will now be unable to provide a vertical blanking signal at terminal 5, since the anode of diode 46 is clamped at a 1 $V_{be}$ level by diode 94. The 1 $V_{be}$ level at terminal 5 is applied to the base of transistor 54, turning that transistor on and rendering transistor 52 conductive, since the base of transistor 52 is normally maintained at a 3.5 $V_{be}$ level by the multiple $V_{be}$ biasing circuit 60. With transistors 52 and 54 in a conductive state, the voltage level at the anode of diode 56 will be at approximately a 3 $V_{be}$ level, which is sufficient to turn on transistors 72 and 74, thereby disabling the vertical output at terminals 3 and 4 and collapsing the raster on the kinescope to a single horizontal line. The horizontal flyback pulses will continue to be provided to the output stage 32 by the horizontal deflection circuit 82. The kinescope drivers 34 may now be adjusted for balanced operation by viewing the single line which is being repetitively scanned on the face of the kinescope 16.

What is claimed is:

1. A circuit arrangement for multiplexing an input signal and output signal through a single terminal of a monolithic integrated circuit comprising:
   means located external to said integrated circuit, and coupled to said terminal, for selectively applying input signals to said terminal of a signal level included within a first range of signal levels;
   a source of signals located within said integrated circuit;
   means, including a first transistor, located within said integrated circuit, and having an input electrode coupled to said internal signal source and an output electrode coupled to said terminal for providing, in the absence of said input signals, output signals at said terminal which occupy a second range of signal levels which is exclusive of said first range; and
   a second transistor, located within said integrated circuit, having an input electrode coupled to said terminal and an output electrode, and biased to be responsive to signals at said terminal which occupy said first range of signal levels, and to be nonresponsive to signals at said terminal which occupy said second range of signal levels.

2. A circuit arrangement for multiplexing an input signal and an output signal at a single circuit terminal comprising:
   means for producing a first output signal;
   an output circuit responsive to said first output signal;
   means for applying said first output signal to said output circuit;
   means for producing a second output signal;
   means for selectively applying an input signal which attains a given threshold to said terminal,
   means, including a first transistor having an input electrode responsive to said second output signal, and an output electrode coupled to said terminal for providing, in the absence of said input signal, a signal at said terminal which is representative of said second output signal and which does not attain said given threshold;
   a second transistor having an input electrode coupled to said terminal and an output electrode coupled to said means for applying said first output signal to said output circuit; and
   means for biasing said second transistor to be nonresponsive to signals at said terminal which do not attain said given threshold,
   wherein said second transistor is responsive to said input signal for preventing application of said first output signal to said output circuit by said means for applying said first output signal to said output circuit.

3. A circuit arrangement for multiplexing an input signal and an output signal at a single circuit terminal comprising:
   means for selectively applying a first input signal to said terminal having a signal level included within a first range of signal levels;
   means, having an input coupled to said terminal and an output for producing a first output signal in response to the selective application of said first input signal;
   means for producing, at an output, a second signal; and
   means, having an input coupled to said second signal producing means and an output coupled to said terminal, and responsive to said second signal for producing, at said terminal, in the absence of said first input signal, a second output signal which varies over a second range of signal levels which is exclusive of said first range,
   wherein said first output signal producing means is nonresponsive to said second output signal.

4. In a television receiver, a circuit arrangement for multiplexing recurrent signals and a service mode indication signal through a common circuit terminal comprising:
   a source of service mode indication signals, coupled to said terminal, for selectively applying a signal indicative of the service mode to said terminal which has a signal level included within a first range of signals;
   a source of recurrent signals;
   means, including a first transistor having an input electrode responsive to said recurrent signals and an output electrode coupled to said terminal for producing, in the absence of said service mode indication signal, replicas of said recurrent signals at said terminal which occupy a second range of signal levels which is exclusive of said first range;
   a second transistor having an input electrode coupled to said terminal and an output electrode; and
   means coupled to said second transistor, for biasing said second transistor to be responsive to input signals occupying said first range of signal levels, and to be nonresponsive to input signals occupying said second range of signal levels.

5. The circuit arrangement of claim 4, further comprising:
   a deflection circuit;
   means, coupled between said recurrent signal source and said deflection circuit, for applying said recurrent signals to said deflection circuit; and
   means for coupling the output electrode of said second transistor to said applying means to disable said recurrent signal applying means when said service mode indication signal is applied to said terminal.

6. The circuit arrangement of claim 4 or 5, wherein said output electrode of said first transistor is a collector electrode, and said means including said first transistor includes a diode serially coupled with the collector-to-emitter path of said first transistor.

7. The circuit arrangement of claim 6, wherein said input electrode of said second transistor is an emitter electrode, and said second transistor biasing means comprises a multiple $V_{be}$ biasing network coupled to the base electrode of said second transistor.

8. The circuit arrangement of claim 7, wherein said second transistor biasing means further includes a diode junction serially coupled between the emitter electrode of said second transistor and said terminal.

9. The circuit arrangement of claim 5, wherein said source of recurrent signals, said means including said first transistor, said second transistor, said second transistor biasing means, said recurrent signal applying means, and said output electrode coupling means are located on a single monolithic integrated circuit chip, and said terminal comprises an integrated circuit pin for coupling said integrated circuit to external circuits.

10. The circuit arrangement of claim 9, wherein said terminal is coupled to video signal processing circuitry to provide said replicas of said recurrent signals thereto when the service mode is not selected, and to provide said input signal indicative of the service mode when the service mode is selected.

* * * * *